(12) United States Patent
Nesfield et al.

(10) Patent No.: US 11,682,405 B2
(45) Date of Patent: Jun. 20, 2023

(54) METHOD AND SYSTEM FOR TRIGGERING EVENTS

(71) Applicant: SONOS EXPERIENCE LIMITED, Hayes (GB)

(72) Inventors: James Nesfield, London (GB); Daniel Jones, London (GB)

(73) Assignee: Sonos Experience Limited, Hayes (GB)

( * ) Notice: Subject to any disclaimer, the term of this patent is extended or adjusted under 35 U.S.C. 154(b) by 105 days.

(21) Appl. No.: 16/623,160

(22) PCT Filed: Jun. 14, 2018

(86) PCT No.: PCT/GB2018/051645
§ 371 (c)(1),
(2) Date: Dec. 16, 2019

(87) PCT Pub. No.: WO2018/229497
PCT Pub. Date: Dec. 20, 2018

(65) Prior Publication Data
US 2021/0098008 A1    Apr. 1, 2021

(30) Foreign Application Priority Data

Jun. 15, 2017 (GB) ...................................... 1709583

(51) Int. Cl.
G10L 19/02 (2013.01)
(52) U.S. Cl.
CPC ..................................... G10L 19/02 (2013.01)
(58) Field of Classification Search
CPC ... G10L 19/018; G10L 25/51; H04N 21/4394; H04N 21/8358

USPC .............................................. 381/80; 700/94
See application file for complete search history.

(56) References Cited

U.S. PATENT DOCUMENTS

| | | | |
|---|---|---|---|
| 4,045,616 A | 8/1977 | Sloane | |
| 4,048,074 A | 9/1977 | Bruenemann et al. | |
| 4,101,885 A | 7/1978 | Blum | |
| 4,323,881 A | 4/1982 | Mori | |
| 4,794,601 A | 12/1988 | Kikuchi | |
| 6,133,849 A | 10/2000 | McConnell et al. | |
| 6,163,803 A | 12/2000 | Watanabe | |
| 6,532,477 B1 | 3/2003 | Tang et al. | |
| 6,711,538 B1 | 3/2004 | Omori et al. | |
| 6,766,300 B1 | 7/2004 | Laroche | |

(Continued)

FOREIGN PATENT DOCUMENTS

| | | |
|---|---|---|
| CN | 105790852 A | 7/2016 |
| CN | 106921650 A | 7/2017 |

(Continued)

OTHER PUBLICATIONS

International Search Report for PCT/GB2018/051645, dated Oct. 4, 2018, 4 pages.

(Continued)

*Primary Examiner* — Alexander Krzystan
(74) *Attorney, Agent, or Firm* — Nixon & Vanderhye, P.C.

(57) ABSTRACT

The present invention relates to a method of triggering an event. The method includes receiving a signal stream, detecting a trigger point within the signal stream using a fingerprint associated with the trigger point and triggering an event associated with the detected trigger point.

23 Claims, 7 Drawing Sheets

(56) References Cited

U.S. PATENT DOCUMENTS

| | | | |
|---|---|---|---|
| 6,909,999 B2 | 6/2005 | Thomas et al. | |
| 6,996,532 B2 | 2/2006 | Thomas | |
| 7,058,726 B1 | 6/2006 | Osaku et al. | |
| 7,349,668 B2 | 3/2008 | Ilan et al. | |
| 7,379,901 B1 | 5/2008 | Philyaw | |
| 7,403,743 B2 | 7/2008 | Welch | |
| 7,944,847 B2 | 5/2011 | Trine et al. | |
| 8,494,176 B2 | 7/2013 | Suzuki et al. | |
| 8,594,340 B2 | 11/2013 | Takara et al. | |
| 8,782,530 B2 | 7/2014 | Beringer et al. | |
| 9,118,401 B1 | 8/2015 | Nieto et al. | |
| 9,137,243 B2* | 9/2015 | Suzuki | H04W 12/03 |
| 9,237,226 B2 | 1/2016 | Frauenthal et al. | |
| 9,270,811 B1 | 2/2016 | Atlas | |
| 9,344,802 B2 | 5/2016 | Suzuki et al. | |
| 10,090,003 B2 | 10/2018 | Wang | |
| 10,186,251 B1 | 1/2019 | Mohammadi | |
| 10,236,006 B1* | 3/2019 | Gurijala | G10L 19/02 |
| 10,236,031 B1* | 3/2019 | Gurijala | G11B 20/10527 |
| 2002/0107596 A1 | 8/2002 | Thomas et al. | |
| 2002/0152388 A1 | 10/2002 | Linnartz et al. | |
| 2002/0184010 A1 | 12/2002 | Eriksson et al. | |
| 2003/0065918 A1 | 4/2003 | Willey | |
| 2003/0195745 A1 | 10/2003 | Zinser, Jr. et al. | |
| 2003/0212549 A1 | 11/2003 | Steentra et al. | |
| 2004/0002858 A1 | 1/2004 | Attias et al. | |
| 2004/0081078 A1 | 4/2004 | McKnight et al. | |
| 2004/0133789 A1 | 7/2004 | Gantman et al. | |
| 2004/0148166 A1 | 7/2004 | Zheng | |
| 2004/0264713 A1 | 12/2004 | Grzesek | |
| 2005/0049732 A1 | 3/2005 | Kanevsky et al. | |
| 2005/0086602 A1 | 4/2005 | Philyaw et al. | |
| 2005/0219068 A1 | 10/2005 | Jones et al. | |
| 2006/0167841 A1 | 7/2006 | Allan et al. | |
| 2006/0253209 A1 | 11/2006 | Hersbach et al. | |
| 2006/0287004 A1 | 12/2006 | Fuqua | |
| 2007/0063027 A1 | 3/2007 | Belfer et al. | |
| 2007/0121918 A1 | 5/2007 | Tischer | |
| 2007/0144235 A1 | 6/2007 | Werner et al. | |
| 2007/0174052 A1 | 7/2007 | Manjunath et al. | |
| 2007/0192672 A1 | 8/2007 | Bodin et al. | |
| 2007/0192675 A1 | 8/2007 | Bodin et al. | |
| 2007/0232257 A1 | 10/2007 | Otani et al. | |
| 2008/0002882 A1 | 1/2008 | Voloshynovskyy et al. | |
| 2008/0011825 A1 | 1/2008 | Giordano et al. | |
| 2008/0027722 A1 | 1/2008 | Haulick et al. | |
| 2008/0031315 A1 | 2/2008 | Ramirez et al. | |
| 2008/0059157 A1 | 3/2008 | Fukuda et al. | |
| 2008/0112885 A1 | 5/2008 | Okunev et al. | |
| 2008/0232603 A1 | 9/2008 | Soulodre | |
| 2008/0242357 A1 | 10/2008 | White | |
| 2008/0262928 A1 | 10/2008 | Michaelis | |
| 2009/0034712 A1 | 2/2009 | Grasley et al. | |
| 2009/0119110 A1 | 5/2009 | Oh et al. | |
| 2009/0141890 A1 | 6/2009 | Steenstra et al. | |
| 2009/0254485 A1 | 10/2009 | Baentsch et al. | |
| 2010/0030838 A1 | 2/2010 | Atsmon et al. | |
| 2010/0064132 A1 | 3/2010 | Ravikiran Sureshbabu | |
| 2010/0088390 A1 | 4/2010 | Bai et al. | |
| 2010/0134278 A1 | 6/2010 | Srinivasan et al. | |
| 2010/0146115 A1 | 6/2010 | Bezos | |
| 2010/0223138 A1 | 9/2010 | Dragt | |
| 2010/0267340 A1 | 10/2010 | Lee | |
| 2010/0290641 A1 | 11/2010 | Steele | |
| 2011/0173208 A1 | 7/2011 | Vogel | |
| 2011/0276333 A1 | 11/2011 | Wang et al. | |
| 2011/0277023 A1 | 11/2011 | Meylemans et al. | |
| 2011/0307787 A1 | 12/2011 | Smith | |
| 2012/0084131 A1 | 4/2012 | Bergel et al. | |
| 2012/0214416 A1 | 8/2012 | Kent et al. | |
| 2012/0214544 A1 | 8/2012 | Shivappa et al. | |
| 2013/0010979 A1 | 1/2013 | Takara et al. | |
| 2013/0030800 A1 | 1/2013 | Tracey et al. | |
| 2013/0034243 A1 | 2/2013 | Yermeche et al. | |
| 2013/0077798 A1 | 3/2013 | Otani et al. | |
| 2013/0216058 A1 | 8/2013 | Furuta et al. | |
| 2013/0223279 A1 | 8/2013 | Tinnakornsrisuphap et al. | |
| 2013/0275126 A1 | 10/2013 | Lee | |
| 2014/0028818 A1 | 1/2014 | Brockway, III et al. | |
| 2014/0046464 A1 | 2/2014 | Reimann | |
| 2014/0053281 A1 | 2/2014 | Benoit et al. | |
| 2014/0074469 A1 | 3/2014 | Zhidkov | |
| 2014/0108020 A1* | 4/2014 | Sharma | G10L 19/018 704/500 |
| 2014/0142958 A1* | 5/2014 | Sharma | G10L 19/02 704/500 |
| 2014/0164629 A1 | 6/2014 | Barth et al. | |
| 2014/0172141 A1 | 6/2014 | Mangold | |
| 2014/0172429 A1 | 6/2014 | Butcher et al. | |
| 2014/0258110 A1 | 9/2014 | Davis et al. | |
| 2015/0004935 A1 | 1/2015 | Fu | |
| 2015/0088495 A1 | 3/2015 | Jeong et al. | |
| 2015/0141005 A1 | 5/2015 | Suryavanshi et al. | |
| 2015/0215299 A1 | 7/2015 | Burch et al. | |
| 2015/0248879 A1 | 9/2015 | Miskimen et al. | |
| 2015/0271676 A1 | 9/2015 | Shin et al. | |
| 2015/0349841 A1 | 12/2015 | Mani et al. | |
| 2015/0371529 A1 | 12/2015 | Dolecki | |
| 2015/0382198 A1 | 12/2015 | Kashef et al. | |
| 2016/0007116 A1 | 1/2016 | Holman | |
| 2016/0098989 A1 | 4/2016 | Layton et al. | |
| 2017/0279542 A1 | 9/2017 | Knauer et al. | |
| 2018/0106897 A1* | 4/2018 | Shouldice | A61M 16/0051 |
| 2018/0115844 A1 | 4/2018 | Lu et al. | |
| 2018/0359560 A1 | 12/2018 | Defraene et al. | |
| 2019/0348041 A1* | 11/2019 | Cella | G10L 15/16 |
| 2020/0105128 A1 | 4/2020 | Frank | |
| 2020/0169327 A1 | 5/2020 | Lin et al. | |
| 2021/0098008 A1* | 4/2021 | Nesfield | G10L 19/02 |

FOREIGN PATENT DOCUMENTS

| | | |
|---|---|---|
| EP | 1 760 693 | 7/2007 |
| EP | 2334111 A1 | 6/2011 |
| EP | 2916554 A1 | 9/2015 |
| EP | 3275117 A1 | 1/2018 |
| EP | 3526912 A1 | 8/2019 |
| GB | 2369995 A | 6/2002 |
| GB | 2484140 A | 4/2012 |
| JP | H1078928 A | 3/1998 |
| JP | 2001320337 A | 11/2001 |
| JP | 2004512765 A | 4/2004 |
| JP | 2004139525 A | 5/2004 |
| JP | 2007121626 A | 5/2007 |
| JP | 2007195105 A | 8/2007 |
| JP | 2008219909 A | 9/2008 |
| WO | 0115021 A2 | 3/2001 |
| WO | 0150665 A1 | 7/2001 |
| WO | 01/61987 | 8/2001 |
| WO | 0163397 A1 | 8/2001 |
| WO | 0211123 A2 | 2/2002 |
| WO | 0235747 A2 | 5/2002 |
| WO | 2004002103 A1 | 12/2003 |
| WO | 2005006566 A2 | 1/2005 |
| WO | 2008131181 A2 | 10/2008 |
| WO | 2016094687 A1 | 6/2016 |

OTHER PUBLICATIONS

Written Opinion of the ISA for PCT/GB2018/051645, dated Oct. 4, 2018, 6 pages.

Wang, "An Industrial-Strength Audio Search Algorithm", Proceedings of 4th International Conference on Music Information Retrieval, Oct. 27, 2003.

Bourguet et al., "A Robust Audio Feature Extraction Algorithm for Music Identification", AES Convention 129; Nov. 4, 2010.

Non-Final Office Action dated Oct. 15, 2021, issued in connection with U.S. Appl. No. 16/496,685, filed Sep. 23, 2019, 12 pages.

Non-Final Office Action dated Jul. 21, 2022, issued in connection with U.S. Appl. No. 16/956,905, filed Jun. 22, 2020, 15 pages.

Non-Final Office Action dated Sep. 24, 2020, issued in connection with U.S. Appl. No. 16/012,167, filed Jun. 19, 2018, 20 pages.

(56) References Cited

OTHER PUBLICATIONS

Non-Final Office Action dated Dec. 27, 2021, issued in connection with U.S. Appl. No. 16/956,905, filed Jun. 22, 2020, 12 pages.
Non-Final Office Action dated Jan. 29, 2021, issued in connection with U.S. Appl. No. 16/342,060, filed Apr. 15, 2019, 59 pages.
Non-Final Office Action dated Feb. 5, 2021, issued in connection with U.S. Appl. No. 16/342,078, filed Apr. 15, 2019, 13 pages.
Notice of Allowance dated Mar. 15, 2018, issued in connection with U.S. Appl. No. 12/926,470, filed Nov. 19, 2010, 10 pages.
Notice of Allowance dated Mar. 19, 2021, issued in connection with U.S. Appl. No. 16/012,167, filed Jun. 19, 2018, 9 pages.
Notice of Allowance dated Aug. 11, 2022, issued in connection with U.S. Appl. No. 16/342,078, filed Apr. 15, 2019, 15 pages.
Notice of Allowance dated Feb. 18, 2022, issued in connection with U.S. Appl. No. 16/564,766, filed Sep. 9, 2019, 8 pages.
Notice of Allowance dated Mar. 29, 2022, issued in connection with U.S. Appl. No. 16/342,060, filed Apr. 15, 2019, 24 pages.
Notice of Allowance dated Apr. 5, 2022, issued in connection with U.S. Appl. No. 16/956,905, filed Jun. 22, 2020, 9 pages.
Soriente et al., "HAPADEP: Human-Assisted Pure Audio Device Pairing*" Computer Science Department, University of California Irvine, 12 pages. [Retrieved Online] URLhttps://www.researchgate.net/publication/220905534_HAPADEP_Human-assisted_pure_audio_device_pairing.
Tarr, E.W. "Processing perceptually important temporal and spectral characteristics of speech", 2013, Available from ProQuest Dissertations and Theses Professional. Retrieved from https://dialog.proquest.com/professional/docview/1647737151?accountid=131444, 200 pages.
United Kingdom Patent Office, United Kingdom Examination Report dated Oct. 8, 2021, issued in connection with United Kingdom Application No. GB2113511.6, 7 pages.
United Kingdom Patent Office, United Kingdom Examination Report dated Jun. 11, 2021, issued in connection with United Kingdom Application No. GB1716909.5, 5 pages.
United Kingdom Patent Office, United Kingdom Examination Report dated Feb. 2, 2021, issued in connection with United Kingdom Application No. GB1715134.1, 5 pages.
United Kingdom Patent Office, United Kingdom Examination Report dated Oct. 29, 2021, issued in connection with United Kingdom Application No. GB1709583.7, 3 pages.
United Kingdom Patent Office, United Kingdom Office Action dated May 10, 2022, issued in connection with United Kingdom Application No. GB2202914.4, 5 pages.
United Kingdom Patent Office, United Kingdom Office Action dated Jan. 22, 2021, issued in connection with United Kingdom Application No. GB1906696.8, 2 pages.
United Kingdom Patent Office, United Kingdom Office Action dated Mar. 24, 2022, issued in connection with United Kingdom Application No. GB2202914.4, 3 pages.
United Kingdom Patent Office, United Kingdom Office Action dated Jan. 28, 2022, issued in connection with United Kingdom Application No. GB2113511.6, 3 pages.
United Kingdom Patent Office, United Kingdom Office Action dated Feb. 9, 2022, issued in connection with United Kingdom Application No. GB2117607.8, 3 pages.
United Kingdom Patent Office, United Kingdom Search Report dated Sep. 22, 2021, issued in connection with United Kingdom Application No. GB2109212.7, 5 pages.
Advisory Action dated Mar. 1, 2022, issued in connection with U.S. Appl. No. 16/342,078, filed Apr. 15, 2019, 3 pages.
Advisory Action dated Aug. 19, 2022, issued in connection with U.S. Appl. No. 16/496,685, filed Sep. 23, 2019, 3 pages.
Bourguet et al. "A Robust Audio Feature Extraction Algorithm for Music Identification," AES Convention 129; Nov. 4, 2010, 7 pages.
C. Beaugeant and H. Taddei, "Quality and computation load reduction achieved by applying smart transcoding between CELP speech codecs," 2007, 2007 15th European Signal Processing Conference, pp. 1372-1376.

European Patent Office, Decision to Refuse dated Nov. 13, 2019, issued in connection with European Patent Application No. 11773522.5, 52 pages.
European Patent Office, European EPC Article 94.3 mailed on Oct. 8, 2021, issued in connection with European Application No. 17790809.2, 9 pages.
European Patent Office, European EPC Article 94.3 mailed on Dec. 10, 2021, issued in connection with European Application No. 18845403.7, 41 pages.
European Patent Office, European EPC Article 94.3 mailed on Oct. 12, 2021, issued in connection with European Application No. 17795004.5, 8 pages.
European Patent Office, European EPC Article 94.3 mailed on Oct. 28, 2021, issued in connection with European Application No. 18752180.2, 7 pages.
European Patent Office, European EPC Article 94.3 mailed on Jul. 6, 2022, issued in connection with European Application No. 20153173.8, 4 pages.
European Patent Office, European Extended Search Report dated Aug. 31, 2020, issued in connection with European Application No. 20153173.8, 8 pages.
European Patent Office, Summons to Attend Oral Proceedings mailed on Mar. 15, 2019, issued in connection with European Application No. 11773522.5-1217, 10 pages.
Final Office Action dated Oct. 16, 2014, issued in connection with U.S. Appl. No. 12/926,470, filed Nov. 19, 2010, 22 pages.
Final Office Action dated Aug. 17, 2017, issued in connection with U.S. Appl. No. 12/926,470, filed Nov. 19, 2010, 22 pages.
Final Office Action dated Nov. 30, 2015, issued in connection with U.S. Appl. No. 12/926,470, filed Nov. 19, 2010, 25 pages.
Final Office Action dated May 10, 2022, issued in connection with U.S. Appl. No. 16/496,685, filed Sep. 23, 2019, 15 pages.
Final Office Action dated Apr. 20, 2020, issued in connection with U.S. Appl. No. 16/012,167, filed Jun. 19, 2018, 21 pages.
Gerasimov et al. "Things That Talk: Using sound for device-to-device and device-to-human communication", Feb. 2000 IBM Systems Journal 39(3.4):530-546, 18 pages. [Retrieved Online] URLhttps://www.researchgate.net/publication/224101904_Things_that_talk_Using_sound_for_device-to-device_and_device-to-human_communication.
Glover et al. "Real-time detection of musical onsets with linear prediction and sinusoidal modeling.", 2011 EURASIP Journal on Advances in Signal Processing 2011, 68, Retrieved from the Internet URL: https://doi.org/10.1186/1687-6180-2011-68, Sep. 20, 2011, 13 pages.
Gomez et al: "Distant talking robust speech recognition using late reflection components of room impulse response", Acoustics, Speech and Signal Processing, 2008. ICASSP 2008. IEEE International Conference on, IEEE, Piscataway, NJ, USA, Mar. 31, 2008, XP031251618, ISBN: 978-1-4244-1483-3, pp. 4581-4584.
Gomez et al., "Robust Speech Recognition in Reverberant Environment by Optimizing Multi-band Spectral Subtraction", 2013 IEEE International Conference on Acoustics, Speech and Signal Processing ICASSP, Jan. 1, 2008, 6 pages.
Goodrich et al., Using Audio inn Secure Device Pairing, International Journal of Security and Networks, vol. 4, No. 1.2, Jan. 1, 2009, p. 57, Inderscience Enterprises Ltd., 12 pages.
International Bureau, International Preliminary Report on Patentability and Written Opinion, dated Apr. 16, 2019, issued in connection with International Application No. PCT/GB2017/053112, filed on Oct. 13, 2017, 12 pages.
International Bureau, International Preliminary Report on Patentability and Written Opinion, dated Apr. 16, 2019, issued in connection with International Application No. PCT/GB2017/053113, filed on Oct. 13, 2017, 8 pages.
International Bureau, International Preliminary Report on Patentability and Written Opinion, dated Dec. 17, 2019, issued in connection with International Application No. PCT/GB2018/051645, filed on Jun. 14, 2018, 7 pages.
International Bureau, International Preliminary Report on Patentability and Written Opinion, dated Mar. 19, 2019, issued in connection with International Application No. PCT/GB2017/052787, filed on Sep. 19, 2017, 7 pages.

(56) References Cited

OTHER PUBLICATIONS

International Bureau, International Preliminary Report on Patentability and Written Opinion, dated Jun. 23, 2020, issued in connection with International Application No. PCT/GB2018/053733, filed on Dec. 20, 2018, 7 pages.
International Bureau, International Preliminary Report on Patentability and Written Opinion, dated Sep. 24, 2019, issued in connection with International Application No. PCT/GB2018/050779, filed on Mar. 23, 2018, 6 pages.
International Bureau, International Search Report and Written Opinion dated Apr. 11, 2019, issued in connection with International Application No. PCT/GB2018/053733, filed on Dec. 20, 2018, 10 pages.
International Searching Authority, International Search Report and Written Opinion dated Jan. 5, 2022, issued in connection with International Application No. PCT/US2021/048380, filed on Aug. 31, 2021, 15 pages.
International Searching Authority, International Search Report and Written Opinion dated Mar. 13, 2018, issued in connection with International Application No. PCT/GB2017/053112, filed on Oct. 13, 2017, 18 pages.
International Searching Authority, International Search Report and Written Opinion dated Nov. 29, 2017, in connection with International Application No. PCT/GB2017/052787, 10 pages.
International Searching Authority, International Search Report and Written Opinion dated Nov. 30, 2011, in connection with International Application No. PCT/GB2011/051862, 6 pages.
International Searching Authority, International Search Report dated Jan. 18, 2018, issued in connection with International Application No. PCT/GB2017/053113, filed on Oct. 17, 2017, 11 pages.
International Searching Authority, International Search Report dated Jun. 19, 2018, issued in connection with International Application No. PCT/GB2018/050779, filed on Mar. 23, 2018, 8 pages.
Japanese Patent Office, Office Action dated Jun. 23, 2015, issued in connection with JP Application No. 2013-530801, 8 pages.
Japanese Patent Office, Office Action dated Apr. 4, 2017, issued in connection with JP Application No. 2013-530801, 8 pages.
Japanese Patent Office, Office Action dated Jul. 5, 2016, issued in connection with JP Application No. 2013-530801, 8 pages.
Lopes et al. "Acoustic Modems for Ubiquitous Computing", IEEE Pervasive Computing, Mobile and Ubiquitous Systems. vol. 2, No. 3 Jul.-Sep. 2003, pp. 62-71. [Retrieved Online] URL https://www.researchgate.net/publication/3436996_Acoustic_modems_for_ubiquitous_computing.
Madhavapeddy, Anil. Audio Networking for Ubiquitous Computing, Oct. 24, 2003, 11 pages.
Madhavapeddy et al., Audio Networking: The Forgotten Wireless Technology, IEEE CS and IEEE ComSoc, Pervasive Computing, Jul.-Sep. 2005, pp. 55-60.
Madhavapeddy et al., Context-Aware Computing with Sound, University of Cambridge 2003, pp. 315-332.
Monaghan et al. "A method to enhance the use of interaural time differences for cochlear implants in reverberant environments.", published Aug. 17, 2016, Journal of the Acoustical Society of America, 140, pp. 1116-1129. Retrieved from the Internet URL: https://asa.scitation.org/doi/10.1121/1.4960572 Year: 2016, 15 pages.
Non-Final Office Action dated Mar. 25, 2015, issued in connection with U.S. Appl. No. 12/926,470, filed Nov. 19, 2010, 24 pages.
Non-Final Office Action dated Mar. 28, 2016, issued in connection with U.S. Appl. No. 12/926,470, filed Nov. 19, 2010, 26 pages.
Non-Final Office Action dated Jan. 6, 2017, issued in connection with U.S. Appl. No. 12/926,470, filed Nov. 19, 2010, 22 pages.
Non-Final Office Action dated Aug. 9, 2019, issued in connection with U.S. Appl. No. 16/012,167, filed Jun. 19, 2018, 15 pages.
Non-Final Office Action dated Feb. 5, 2014, issued in connection with U.S. Appl. No. 12/926,470, filed Nov. 19, 2010, 22 pages.
Non-Final Office Action dated Jul. 11, 2022, issued in connection with U.S. Appl. No. 17/660,185, filed Apr. 21, 2022, 20 pages.
Non-Final Office Action dated Aug. 12, 2021, issued in connection with U.S. Appl. No. 16/342,060, filed Apr. 15, 2019, 88 pages.

\* cited by examiner

METHOD AND SYSTEM FOR TRIGGERING EVENTS

This application is the U.S. national phase of International Application No. PCT/GB2018/051645 filed 14 Jun. 2018, which designated the U.S. and claims priority to GB Patent Application No. 1709583.7 filed 15 Jun. 2017, the entire contents of each of which are hereby incorporated by reference.

FIELD OF INVENTION

The present invention is in the field of signal processing. More particularly, but not exclusively, the present invention relates to processing signals to trigger events.

BACKGROUND

Signals, such as audio signals, can be processed to analyse various qualities of the signal.

For example, for streaming audio signals, Shazam technology analyses the audio signal to form a fingerprint of the audio signal. This fingerprint is then compared to a database of audio fingerprints to identify which music track the audio signal originates from.

The Shazam technology is optimised for hardware with sufficient compute to calculate fingerprints of the streaming audio signal and optimised for identifying one music track out of millions.

It would be desirable if a system could be developed which could be used on lower cost hardware to optimally analyse streaming signals to trigger events.

It is an object of the present invention to provide a method and system for triggering events which overcomes the disadvantages of the prior art, or at least provides a useful alternative.

SUMMARY OF INVENTION

According to a first aspect of the invention there is provided a method of triggering an event, including:
a) receiving a signal stream;
b) detecting a trigger point within the signal stream using a fingerprint associated with the trigger point; and
c) triggering an event associated with the detected trigger point;

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for triggering events.

The inventors have discovered that fingerprints can be used to analyse a streamed signal, such as an audio signal, directly. This can enable the triggering of events at specific time locations, or trigger points, within the streamed signal.

Figure 1:
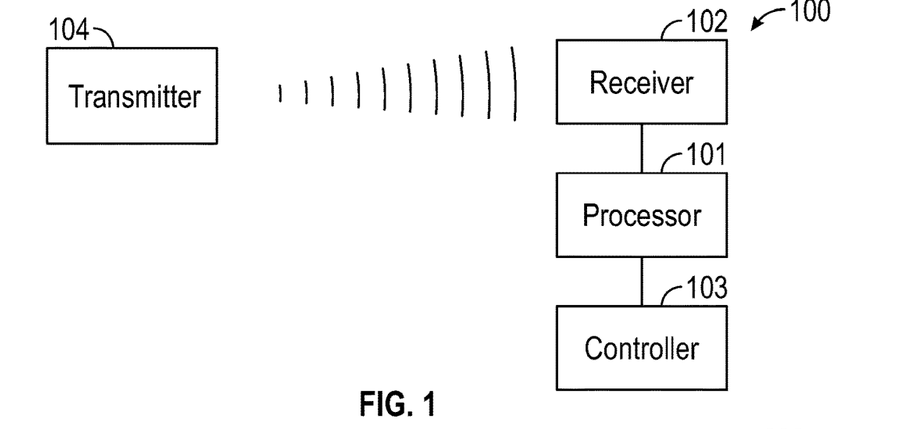
FIG. 1: shows a block diagram illustrating a system in accordance with an embodiment of the invention.

In FIG. 1, a system 100 in accordance with an embodiment of the invention is shown.

One or more processors 101 are shown. The one or more processors 101 may be configured receive a signal stream from a signal receiver 102, to detect a trigger point within the signal stream using a fingerprint associated with the trigger point, and to trigger an event associated with the trigger point. Triggering the event may result in generation of one or more event instructions. The event instructions may control one or more apparatus via one or more controllers 103.

The one or more processors 101 may detect the trigger point from a set of trigger points. The one or more processors 101 may detect the trigger point may comparing one or more of the set of fingerprints associated with the trigger points to the signal stream. The signal stream may be processed for the comparison. In one embodiment, each frame of the signal stream is processed via a Fast Fourier Transform (FFT) and at least some of the frames are compared with at least one fingerprint associated with a trigger point of the set of trigger points.

The system 100 may include a signal receiver 102 configured to receive an analogue signal, such as an audio signal, from a signal transmitter 104 and to provide the signal as a signal stream to the one or more processors 101.

The signal receiver 102 may be an input device such as a microphone, a camera, a radio frequency receiver or any analogue sensor.

The system 100 may include one or more controllers 103. The controllers 103 may be configured for receiving events instructions from the one or more processors 101 to control one or more apparatus. For example, the one or more apparatus may include mechanical apparatus, transmitters, audio output, displays, or data storage.

The system 100 may include a signal transmitter 104. The signal transmitter 104 may correspond to the signal receiver 102 (e.g. a speaker for a microphone), and may be an audio speaker, a light transmission apparatus, a radio frequency transmitter, or any analogue transmitter.

In one embodiment, the audio signals may be in the audible range, inaudible range, or include components in both the audible and inaudible range.

Figure 2:
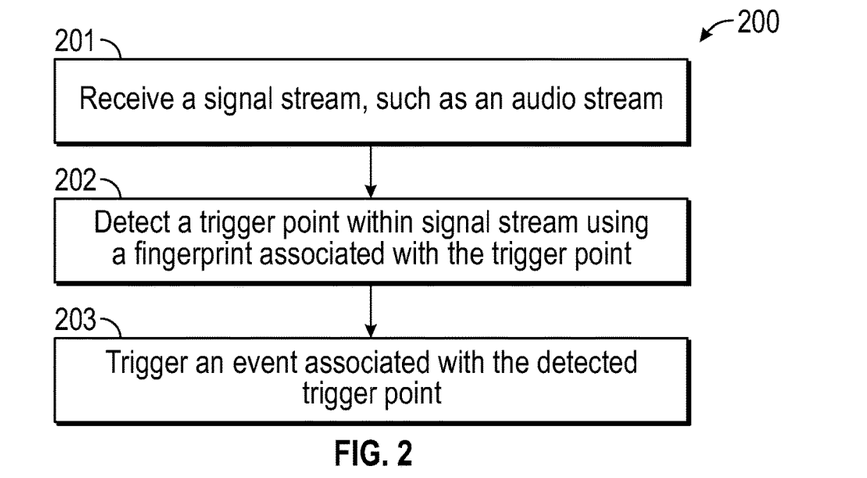
FIG. 2: shows a flow diagram illustrating a method in accordance with an embodiment of the invention.

Referring to FIG. 2, a method 200 for triggering events in accordance with an embodiment of the invention will be described.

In step 201, a signal stream is received. The signal stream may be received via a signal receiver (e.g. receiver 102). The signal may be audio. The audio signal may be correspond to an audio track. The signal receiver may be a microphone.

The signal stream may be received in real-time via the signal receiver.

The audio signal may be formed of audible, inaudible or a audible/inaudible components.

In step 202, a trigger point is detected within the signal stream using a fingerprint associated with the trigger point. The trigger point may be one of a set of trigger points. A fingerprint for each of plurality of trigger points may be compared against the signal stream to detect a trigger point. A detected trigger point may be the fingerprint which matches the signal stream beyond a predefined or dynamic threshold, the closest match within the set of trigger points, or the closest match within a subset of the set of trigger points.

Figure 3:
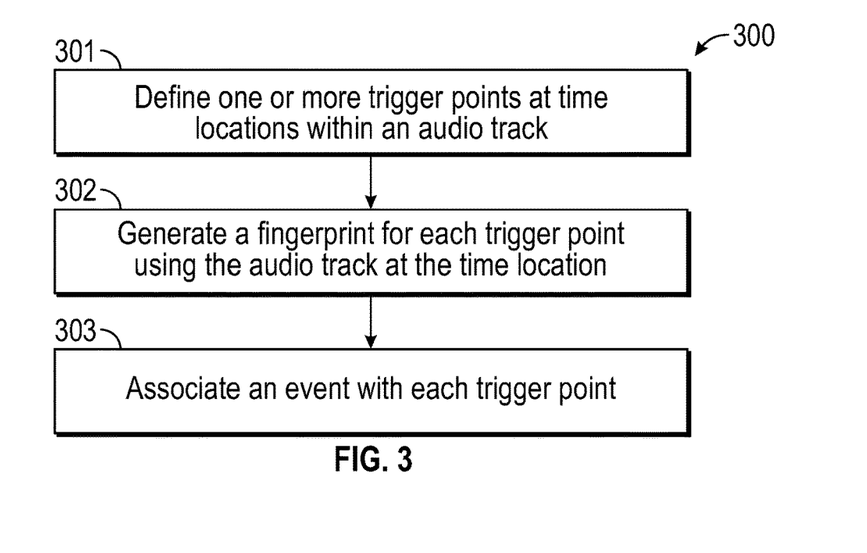
FIG. 3: shows a flow diagram illustrating a method in accordance with an embodiment of the invention.

In one embodiment, the trigger points and associated fingerprints may be created as described in relation to FIG. 3.

In one embodiment, the trigger points and associated fingerprints are predefined, and not generated from an existing signal (such as an audio track). The signal (e.g. the audio signal) may be generated for transmission based upon the fingerprint information. For example, a broadcast device may synthesis new audio with notes at the corresponding time/frequency offsets of the fingerprint.

The fingerprint may be formed of a set of peaks within 2D coordinate space of a magnitude spectrum.

Spectral magnitudes may be calculated from the signal stream to form a rolling buffer (with a size T forming a spectral frame within the buffer).

A trigger point may be detected within the signal by iterating over at least some of the peaks within the set of peaks for the fingerprint and examining the corresponding coordinate in the spectral frame in the buffer. A confidence level may be calculated for each peak examination by measuring properties such as the ration between the peak's intensity and the mean intensity of its neighbouring bins. An overall confidence interval may be calculated for the set of peaks by taking, for example, the mean of the individual peak confidences.

In on embodiment, fingerprints for multiple trigger points may be used to examine the spectral frame. In this case, the fingerprint with the highest confidence interval may be identified.

Where the confidence interval for an entire fingerprint exceeds a threshold (and is the highest confidence where multiple fingerprints are used), the trigger point associated with fingerprint is detected within the audio stream.

In step 203, an event associated with the trigger point is triggered when the trigger point is detected.

The event may result in a controller (e.g. controller 103) actuating, for example, play-back of audio corresponding to the trigger point, generation of mechanical movement in time with the audio signal, manifestation of electronic game-play coordinated to audio signal, display of related material synchronised in time to the signal (such as subtitles), generation of any time synchronisation action, or any other action.

Steps 201, 202 and 203 may be performed by one or more processors (e.g. processor(s) 101).

Referring to FIG. 3, a method 300 for creating a trigger points for an audio track in accordance with an embodiment of the invention will be described.

In step 301, one or more trigger points are defined for the audio track at time locations within the audio track. Each trigger point may be associated with a timing offset from the start of the audio track.

In step 302, an associated fingerprint is generated at the time location for each trigger point.

The associated fingerprint may be generated from peaks identified within a FFT of the audio track at the time location. The peaks may be local magnitude maxima of the 2D coordinate space created by each FFT block and FFT bin.

In step 303, an event is associated with each trigger point.

The one or more trigger points with each associated fingerprint and event may then be used by the method described in relation to FIG. 2.

Referring to FIGS. 4 to 9, a method of creating and detecting trigger points will be described in accordance with an embodiment of the invention.

Figure 4:
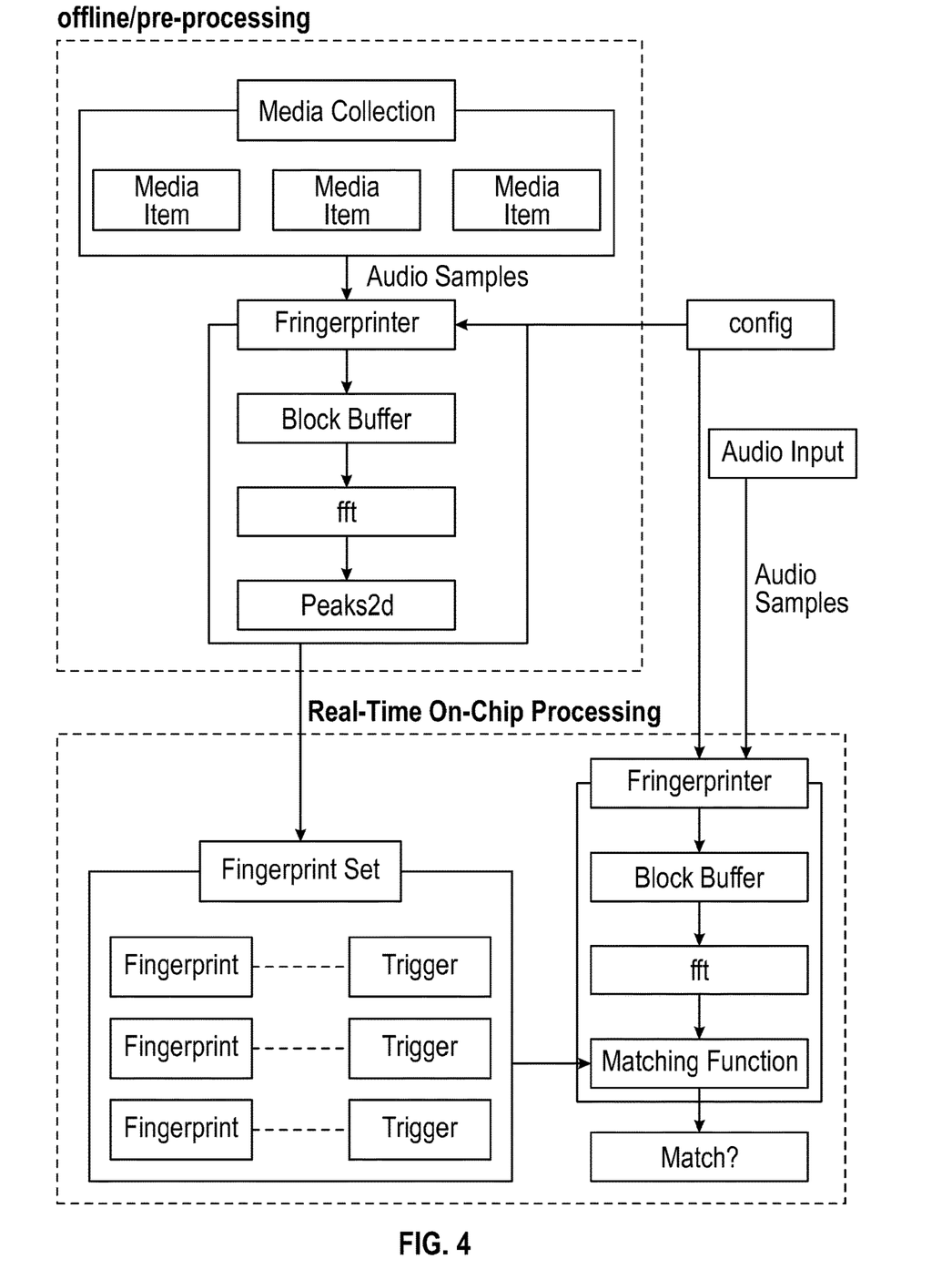
FIG. 4: shows a block diagram illustrating a system in accordance with an embodiment of the invention.

This embodiment of the invention performs real-time recognition of predetermined audio segments, triggering an event when a segment is recognised in the incoming audio stream. The objective is to be able to respond in real-time, with the following key properties:
- minimal latency (less than 50 ms)
- high reliability (99% recognition rate in typical acoustic environments over a distance of 1 m)
- low false-positive rate (events should rarely be triggered at the wrong moment, if ever)

To perform audio triggering, two phases are involved.
1. Audio fingerprinting (offline, non real-time): An input media file, plus an index of 'FINGERPRINT_COUNT' unique trigger timestamps (all within the duration of the media file), are used to generate 'FINGERPRINT_COUNT' audio "fingerprints". Each fingerprint characterises the 'FINGERPRINT_WIDTH' frames of audio leading up to its corresponding timestamp in the trigger index, where 'FINGERPRINT_WIDTH' is the fixed duration of a fingerprint.
2. Audio recognition (online, real-time): The set of fingerprints produced by Phase 1 are fed into a separate audio recognition system. This system listens to a live audio stream and attempts to recognise fingerprints from its database within the stream. When a fingerprint is recognised, the corresponding trigger is generated.

Spectral Peaks

Both phases utilise the concept of a "spectral peak". Given a 2D segment of an acoustic spectrum over some period of time, a spectral peak is a 2D point in space (where the X-axis is the time, delineated in FFT frames, and the Y-axis is frequency, delineated in FFT bins) which has some degree of "elevation" over the surrounding peaks.

The elevation of a peak is the difference between its decibel magnitude and the mean magnitude of some selection of peaks around it. A peak with a greater elevation is substantially louder than the spectrogram cells around it, meaning it is perceptually prominent. A short, sharp burst of a narrow frequency band (for example, striking a glockenspiel) would result in a peak of high elevation.

Peaks may be used to characterise audio segments because they have fixed linear relationships in the time and frequency domains, and because they may be robust to background noise. When a given audio recording is played back over a reasonable-quality speaker, the resultant output will typically demonstrate peaks of roughly similar elevation. Even when background noise is present, peaks at the original locations will still mostly be evident.

This recognition system may require that peaks be identically distributed in the original fingerprint and the audio stream to recognise effectively. Therefore, it assumes that the audio will not be altered before playback. For example, if it played at a lower speed or pitch, the recognition may fail. However, this system should remain robust to processes such as distortion, filtering effects from acoustic transducers, and degradation from compression codecs, all of which do not heavily affect the linear relationships between peaks in time and frequency.

In this algorithm, 'NEIGHBOURHOOD_WIDTH' and 'NEIGHBOURHOOD_HEIGHT' are used define the minimum spacing between peaks. 'NEIGHBOURHOOD_WIDTH' is measured in FFT frames, and 'NEIGHBOURHOOD_HEIGHT' in FFT bins.

Different algorithms used to determine and match peaks for the fingerprinting and recognition phases. In the fingerprinting phase, the algorithm may be optimised for precision, to ensure that the best-possible peaks are selected. In the recognition phase, the algorithm may be optimised for speed and efficiency.

An overview flow chart of the fingerprinter and recogniser ("scanner") is shown in FIG. 4.

Peak Elevation Function

Figure 5:
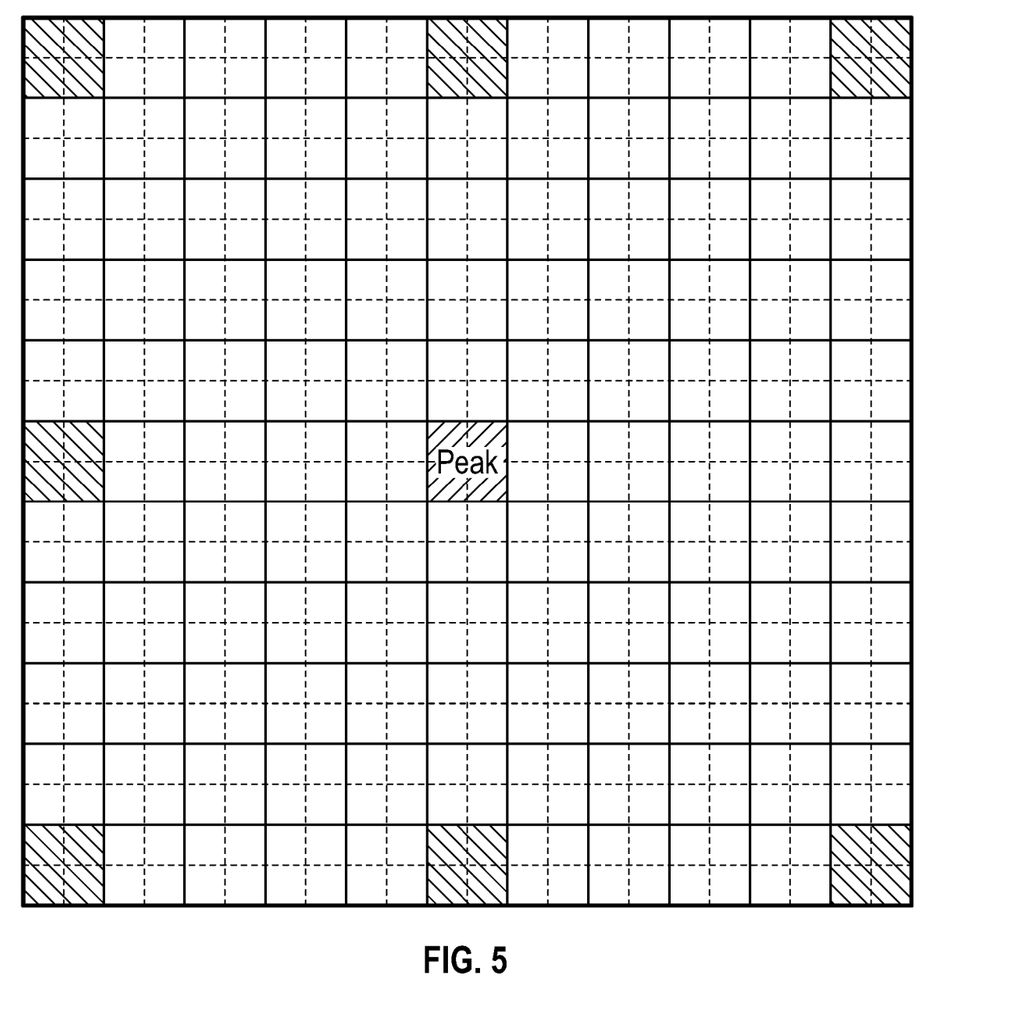
FIG. 5: shows a diagram illustrating a function for determining peak elevation using neighbour reference points in accordance with an embodiment of the invention.
Figure 6:
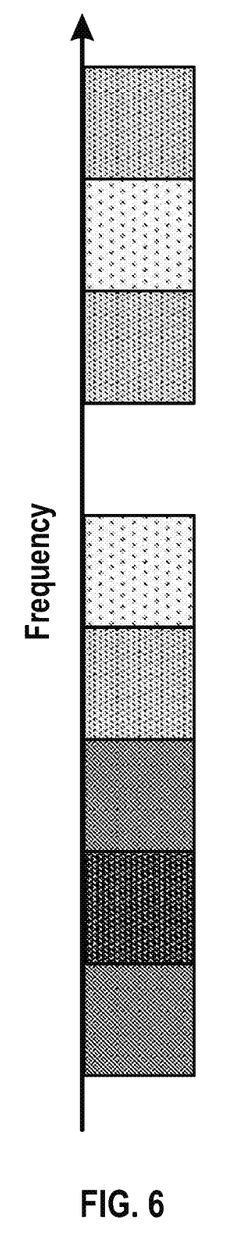
FIG. 6: shows a diagram illustrating a 1D slice of a magnitude spectrum buffer in accordance with an embodiment of the invention.

The key characteristic of a peak is its elevation. In a time-unlimited system, this would typically be determined by taking the mean magnitude of all the cells in the peak's neighbourhood, and calculating the ratio of the peak's magnitude vs the mean surrounding magnitude.

However, this may require a lot of calculations (up to '(NEIGHBOURHOOD_WIDTH*2+1)×(NEIGHBOURHOOD_HEIGHT*2+1)-1': 120 calculations for width and height of 5). In one embodiment, to enhance efficiency, more economical neighbourhood functions to determine whether a peak's elevation can be determined with fewer reference points have been discovered to be effective.

One such current elevation function makes use of 7 reference points around the peak: in the 4 corners of its Moore neighbourhood, and the top, bottom and left edges. The right edge is omitted as this may be susceptible to be artificially amplified by note tails and reverberation from the peak's acoustic energy. This is shown in FIG. 5.

Phase 1: Audio Fingerprinting

The audio fingerprinting phase is designed to identify and prioritise the peaks that uniquely and reliably characterise each segment of audio. It is typically performed offline prior to any recognition process, meaning it may not need to be designed for efficiency.

The fingerprinting phase proceeds as follows:

The fingerprinter is given a media file (for example, a mono uncompressed audio file) and an index of times at which trigger events are to occur.

The fingerprinter opens the media file and proceeds to read the contents in FFT-sized buffers (typically 256 frames). Each buffer, an FFT is performed and the magnitude spectrum derived. This magnitude spectrum is added to a rolling buffer.

Figure 7:
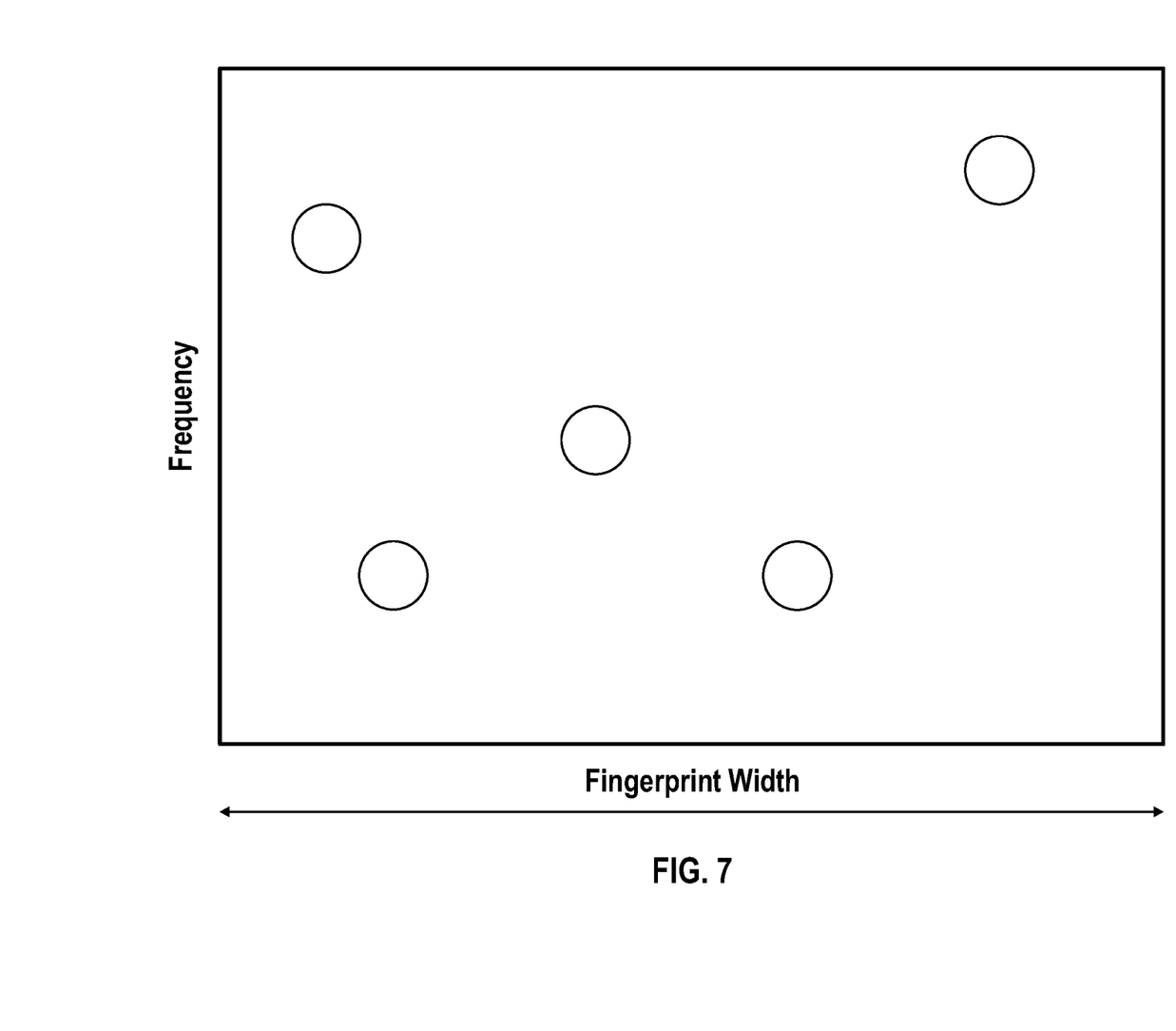
FIG. 7: shows a diagram illustrating peaks located using a system in accordance with an embodiment of the invention.

Each frame, the last 'NEIGHBOURHOOD_WIDTH*2+1' frames of the rolling buffer are inspected to find peaks. This is done by iterating over each cell in the 1D line (shown in FIG. 6) running down the centre of the buffer, and checking if it is a local maxima in the Moore neighbourhood of size 'NEIGHBOURHOOD_WIDTH×NEIGHBOURHOOD_HEIGHT'. If it is the maxima, the elevation function is applied to determine the peak-candidate's elevation versus nearby cells (see "Peak Elevation Function" above). If the peak-candidate's elevation exceeds a threshold in decibels ('FINGERPRINT_PEAK_THRESHOLD', typically around 12 dB), it is classified as a peak and added to another rolling buffer of width 'FINGERPRINT_WIDTH' as shown in FIG. 7.

Figure 8:
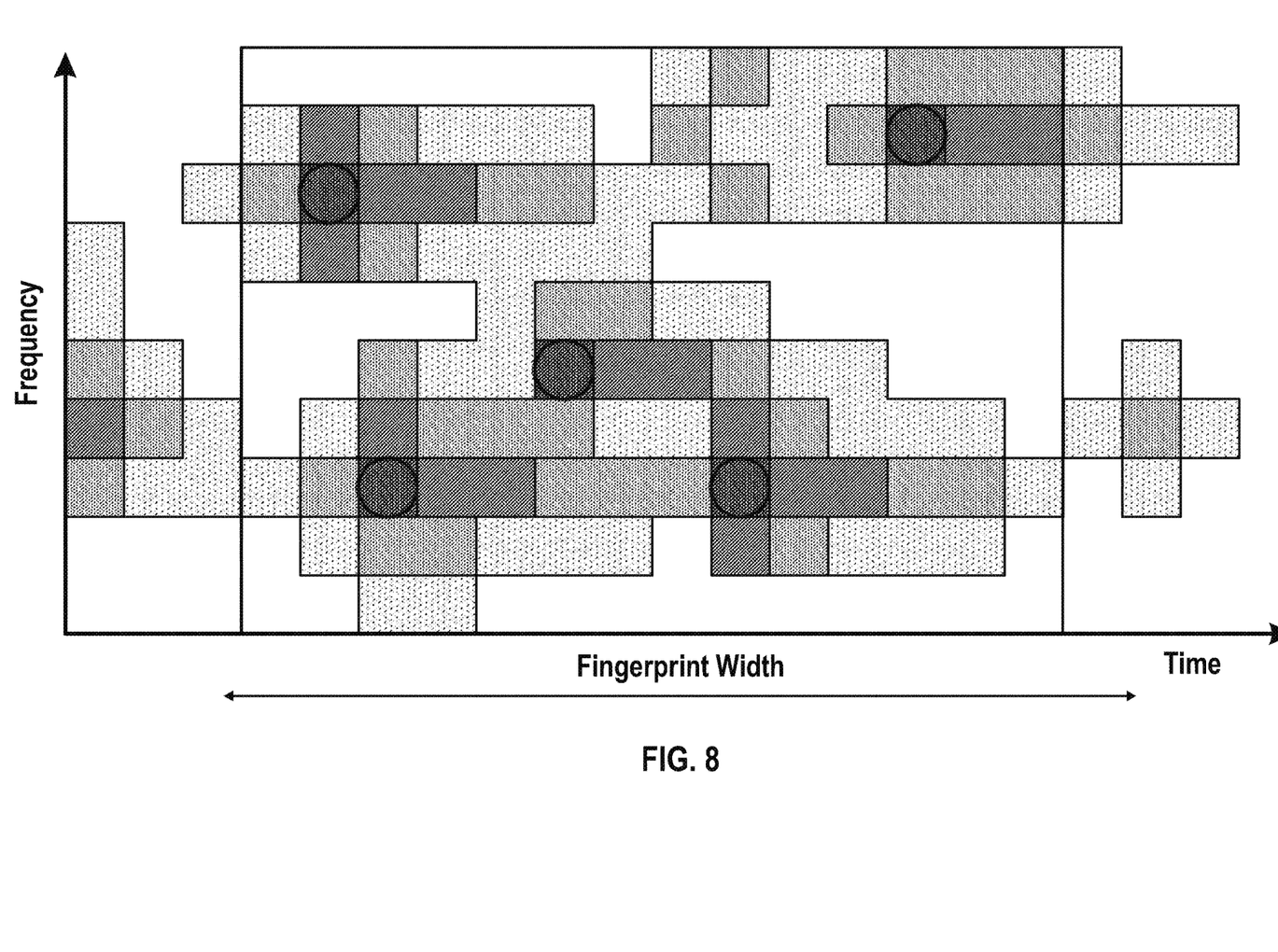
FIG. 8: shows a diagram illustrating peaks located using a system in accordance with another embodiment of the invention.

Note that the 1D-slice part of the above step may be performed for efficiency. An alternative approach would be to store a rolling spectrogram buffer of width 'FINGERPRINT_WIDTH', and do a brute-force search of the buffer for peaks as shown in FIG. 8.

When the fingerprinter reaches a frame whose timestamp corresponds to a trigger timestamp, it collects the peaks for the previous 'FINGERPRINT_WIDTH' spectral frames. These peaks are ordered by their elevation (descending), and any peaks beyond the first 'MAX_PEAK_COUNT' peaks are rejected. This ensures that each fingerprint has a maximum number of peaks. The prioritisation is imposed because peaks with a higher elevation are proportionately more likely survive acoustic playback and be detected by the decoder. This allows "weaker" peaks to be omitted, improving efficiency later.

When the entire set of fingerprints have been collected, they are serialised to disk as a "fingerprint set". A fingerprint set is characterised by:
the number of fingerprints it contains;
for each fingerprint, its width, its ID number, the number of peaks it contains, and each peak's X/Y coordinate, with each peak ordered by magnitude (descending).

Phase 2: Audio Recognition

The audio recogniser takes a set of fingerprints and a stream of audio (usually real-time), and attempts to recognise fingerprints within the stream.

It functions as follows:

Audio is read in FFT block-sized chunks. An FFT is performed to obtain the magnitude spectrum, which is appended to a rolling buffer of width 'FINGERPRINT_WIDTH'. This acts as an acoustic spectrum history, containing the most recent frames of precisely the same width as a fingerprint.

Figure 9:
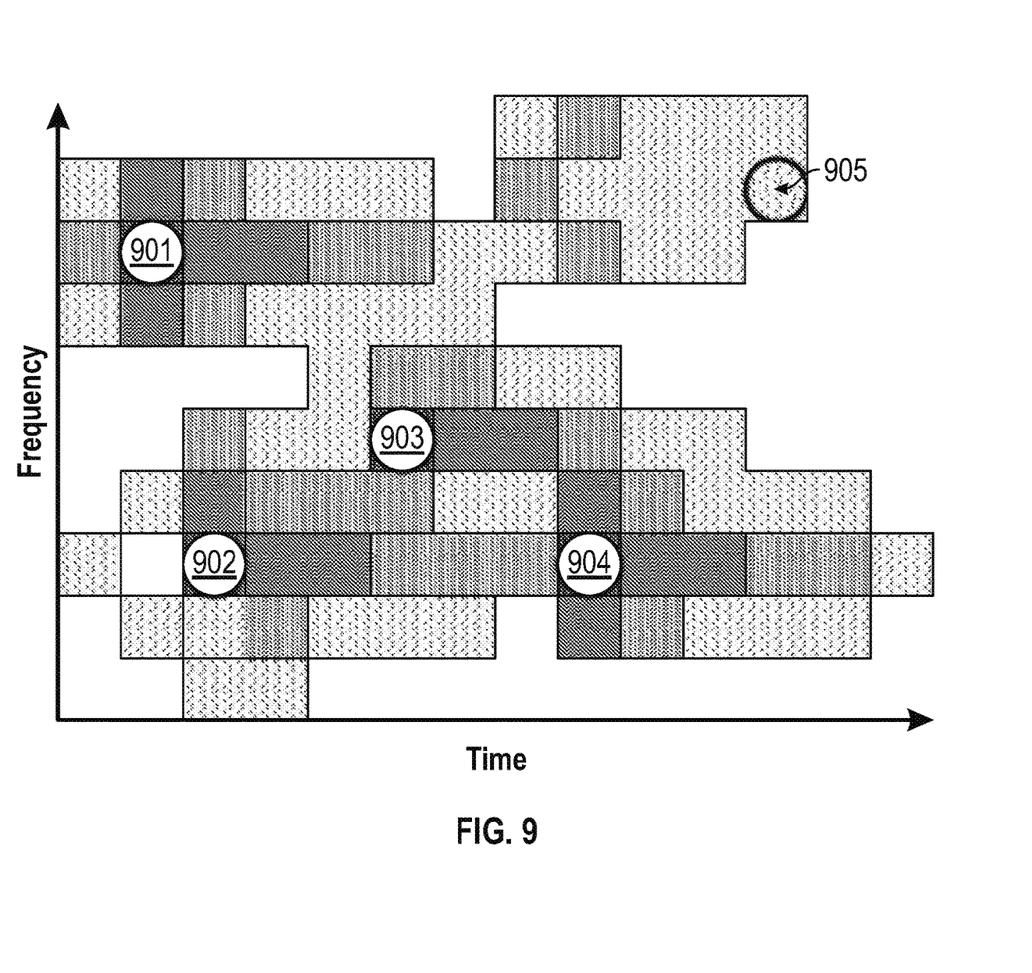
FIG. 9: shows a diagram illustrating examination of a magnitude spectral history buffer using a fingerprint in accordance with an embodiment of the invention.

Each frame, the scanner iterates over every available fingerprint. Each peak's (x, y) coordinates are examined within the spectral history buffer, and its elevation calculated according to the same elevation function as the fingerprinter (e.g., for the EDGES elevation function, comparing its value to the mean of 7 points around it). If the decibel difference between the peak's magnitude and the surrounding background magnitude exceeds a fixed 'CANDIDATE_PEAK_THRESHOLD', the peak is classified as a match. The 'CANDIDATE_PEAK_THRESHOLD' is measured in decibels, similar to the 'FINGERPRINT_PEAK_THRESHOLD' used to select peaks for the fingerprint. However, the 'CANDIDATE_PEAK_THRESHOLD' is substantially lower, as background noise and filtering may reduce a peak's prominence in real-world playback. FIG. 9 shows examining of a fingerprint formed from the peaks of FIG. 7 against the spectral history buffer. Peak matches are shown at 901, 902, 903, and 904, and a peak non-match shown at 905.

After all the peaks have been classified, a confidence level is determined for the fingerprint as a whole by calculating 'PEAKS_MATCHED/TOTAL_NUM_PEAKS' (i.e., the proportion of peaks matched). If this exceeds a fixed 'CANDIDATE_CONFIDENCE_THRESHOLD' (usually around 0.7), the fingerprint is classified as matching.

Matching then continues in case another fingerprint is matched at a higher confidence.

'WAIT_FOR_PEAK' operation: The fingerprint with the highest confidence is selected as a match. Matches can sometimes occur one or two frames earlier than expected (with confidence levels rising quickly to a peak and then dropping again). To ensure a match isn't triggered too soon, the match is recorded. The following frame, if the confidence level drops, the match is triggered. If the confidence level rises, the match is recorded again to be checked the following frame. Matches are thus always triggered with one frame of delay, _after_the peak value.

Once a fingerprint match has been triggered, a trigger can not then occur again for a fixed number of frames to ensure accidental re-triggers. Optionally, the specific trigger ID can be disabled automatically for some period.

Audio Recognition: Additional Optimisations

Additional optimisations may be used to further reduce the CPU footprint of audio recognition, with minimal impact on recognition success rate:

Early Rejection

As a given fingerprint's peaks are ordered by magnitude, descending, the first peaks are the most prominent and thus most likely to be successfully recognised in real-world playback.

For efficiency, an algorithm may be used that first inspects a small proportion (e.g. 20%) of a fingerprint's peaks. The mean confidence of these peaks is calculated, and compared to a threshold value that is lower than 'CANDIDATE_CONFIDENCE_THRESHOLD' (e.g, '0.8' of the overall candidate threshold). If the mean confidence of this initial sample falls below the minimum threshold, it is unlikely that the fingerprint as a whole will be a match, and the rest of the peaks are not inspected.

If the mean confidence is above the threshold, the remainder of the peaks are inspected as normal, and the fingerprint as a whole either accepted or rejected.

The values of 'CHIRP_FINGERPRINT_SCANNER_EARLY_REJECT_PROPORTION' and 'CHIRP_FINGERPRINT_SCANNER_EARLY_REJECT_LOWER_THRESHOLD' are selected to minimise the number of peaks that must be inspected on average, whilst minimising the number of actual matches that are missed.

Note that this technique can also function with an unordered set of peaks.

Disable Below Minimal Threshold

As acoustic spectra tend to be correlated over time, is unlikely that a match (with confidence of 0.7 above, corresponding to 70% of the peaks matching up) will arise immediately after a spectral block with a match rate of a low value such as 0.01.

Therefore, a feature may be used to temporarily disable a fingerprint if its confidence is below some minimal threshold, removing it from the match pool for the next 'CHIRP_FINGERPRINT_DISABLED_DURATION' frames.

A potential advantage of some embodiments of the present invention is that trigger points within streamed signals can be used to trigger events. This may provide various functionality such as synchronisation of events with the streamed signal. Furthermore, by detecting the trigger point using the fingerprint rather than calculating fingerprints from the streamed signal, computation is reduced enable deployment on lower cost hardware.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method of triggering an event by a device comprising a processor and memory, the method including:
   receiving an audio signal;
   detecting a trigger point within the audio signal, wherein detecting the trigger point within the audio signal includes:
      processing the audio signal to provide a plurality of frames;
      identifying, in the plurality of frames, a first frame including a fingerprint associated with the trigger point from a plurality of fingerprints stored in the memory, each of the plurality of fingerprints corresponding to a different event;
      determining a confidence of the fingerprint being in the first frame and a confidence of the fingerprint being in a second frame after the first frame; and
      based on the confidence of the fingerprint being in the second frame being lower than the confidence of the fingerprint being in the first frame, determining the trigger point to correspond to the second frame; and
   triggering an event associated with the fingerprint in the first frame, a timing of the event synchronized to the detected trigger point within the audio signal.

2. The method as claimed in claim 1, wherein the audio signal is an analogue signal.

3. The method as claimed in claim 1, wherein the triggering of the event causes the processor to control a mechanical movement of the device synchronized to the detected trigger point.

4. The method as claimed in claim 1, wherein the audio signal is from an audio track.

5. The method as claimed in claim 1, wherein the audio signal is received via a microphone.

6. The method as claimed in claim 1, wherein the trigger point is one from a set of trigger points within the audio signal.

7. The method as claimed in claim 1, wherein each fingerprint of the plurality of fingerprints comprises a plurality of spectral peaks.

8. The method as claimed in claim 7, wherein each fingerprint of the plurality of fingerprints is constructed using the highest spectral peaks at a predefined time for the trigger point.

9. The method as claimed claim 6, wherein the trigger point is detected by comparing fingerprints for at least some of the trigger points to the plurality of frames and the detected trigger point is the trigger point with the highest confidence match.

10. The method as claimed in claim 1, wherein detecting the trigger point within the audio signal comprises identifying multiple fingerprints in the audio signal, calculating a confidence level for each of the identified multiple fingerprints, selecting a fingerprint from among the identified multiple fingerprints having a highest confidence match, and the trigger point corresponding to the selected fingerprint from among the identified multiple fingerprints is used to trigger the event.

11. The method as claimed in claim 1, wherein processing the audio signal to provide the plurality of frames includes processing the audio signal by Fast Fourier Transform (FFT) to produce a plurality of magnitude spectrum frames, a width of the frames corresponding to a width of the plurality of fingerprints.

12. The method as claimed in claim 11, wherein the trigger point is detected within the magnitude spectrum frames based on determining whether the plurality of fingerprints corresponds to one or more magnitude spectrum frames.

13. The method as claimed in claim 1, wherein a plurality of trigger points are detected over time within the audio signal.

14. A method of triggering an event, including:
receiving, by a receiver, a signal from a transmitter;
outputting, by the receiver, the signal to a processor;
processing, using the processor, the signal output by the receiver;
detecting, using the processor, a trigger point within the signal processed by the processor using a fingerprint associated with the trigger point, wherein the fingerprint comprises a plurality of spectral peaks; and
triggering, using the processor, an event associated with the detected trigger point,
wherein, during detecting of the trigger point, a fingerprint for a trigger point is rejected for a match if a defined proportion of the spectral peaks are not detected in the signal processed by the processor.

15. The method as claimed in claim 14, wherein the proportion of spectral peaks are the highest spectral peaks.

16. The method as claimed in claim 6, wherein, during detecting of the trigger point, a trigger point is not used for matching if the trigger point matched below a defined confidence level for a previous frame.

17. A non-transitory computer readable medium having stored therein computer-readable instructions that, when executed by one or more processors, cause the one or more processors to:
receive an audio signal;
detect a trigger point within the audio signal, wherein detecting the trigger point within the audio signal includes:
processing the audio signal to provide a plurality of frames;
identifying, in the plurality of frames, a first frame including a fingerprint associated with the trigger point from a plurality of fingerprints stored in memory, each of the plurality of fingerprints corresponding to a different event;
determining a confidence of the fingerprint being in the first frame and a confidence of the fingerprint being in a second frame after the first frame; and
based on the confidence of the fingerprint being in the second frame being lower than the confidence of the fingerprint being in the first frame, determining the trigger point to correspond to the second frame; and
trigger an event associated with the fingerprint in the first frame, a timing of the event synchronized to the detected trigger point within the audio signal.

18. A non-transitory computer readable medium having stored therein computer-readable instructions that, when executed by one or more processors, cause an apparatus connected to the one or more processors to:
control a receiver to receive a signal from a transmitter and output the signal to the one or more processors;
control the receiver to output the signal to the one or more processors;
process the signal output by the receiver;
detect a trigger point within the signal processed by the one or more processors using a fingerprint associated with the trigger point, wherein the fingerprint comprises a plurality of spectral peaks; and
trigger an event associated with the detected trigger point,
wherein, during detecting of the trigger point, a fingerprint for a trigger point is rejected for a match if a defined proportion of the spectral peaks are not detected in the signal processed by the one or more processors.

19. An apparatus comprising:
memory; and
a processor operatively coupled to the memory and configured to control the apparatus to:
receive an audio signal;
detect a trigger point within the audio signal, wherein detecting the trigger point within the audio signal includes:
processing the audio signal to provide a plurality of frames;
identifying, in the plurality of frames, a first frame including a fingerprint associated with the trigger point from a plurality of fingerprints stored in the memory, each of the plurality of fingerprints corresponding to a different event;
determining a confidence of the fingerprint being in the first frame and a confidence of the fingerprint being in a second frame after the first frame; and
based on the confidence of the fingerprint being in the second frame being lower than the confidence of the fingerprint being in the first frame, determining the trigger point to correspond to the second frame; and
trigger an event associated with the fingerprint in the first frame, a timing of the event synchronized to the detected trigger point within the audio signal.

20. An apparatus comprising:
a receiver;
memory; and
a processor operatively coupled to the memory and the receiver and configured to control the apparatus to:
receive, by the receiver, a signal from a transmitter;
output, by the receiver, the signal to the processor;
process the signal output by the receiver;
detect a trigger point within the signal processed by the processor using a fingerprint associated with the trigger point, wherein the fingerprint comprises a plurality of spectral peaks; and
trigger an event associated with the detected trigger point,
wherein, during detecting of the trigger point, a fingerprint for a trigger point is rejected for a match if a defined proportion of the spectral peaks are not detected in the signal processed by the processor.

21. The apparatus of claim 19, further comprising a mechanical mechanism configured to move and wherein the processor is configured to control movement of the mechanical mechanism synchronized to the detected trigger point within the audio signal.

22. The apparatus of claim 19, wherein processing the audio signal to provide a plurality of frames includes processing the audio signal by Fast Fourier Transform (FFT) to produce a plurality of magnitude spectrum frames, a width of the frames corresponding to a width of the plurality of fingerprints, and detecting the trigger point within the audio signal comprises:
  identifying multiple fingerprints in a plurality of adjacent magnitude spectrum frames of the audio signal;
  calculating a confidence level for each of the identified multiple fingerprints; and
  selecting a fingerprint from among the identified multiple fingerprints having a confidence level that is higher than a confidence level of a fingerprint following the selected fingerprint, wherein the trigger point corresponds to the magnitude spectrum frame following the magnitude spectrum frame of the selected fingerprint from among the identified multiple fingerprints.

23. The apparatus of claim 19, wherein the processor is further configured to control the apparatus to: after triggering the event, disabling the detecting of a next trigger point for a predetermined period of time.

\* \* \* \* \*